W. J. PARTTRIDGE.
SEED STRIPPER.
APPLICATION FILED AUG. 12, 1920.

1,389,157.

Patented Aug. 30, 1921.
2 SHEETS—SHEET 1.

Inventor
W. J. Parttridge.
By CA Snow & Co.
Attorneys

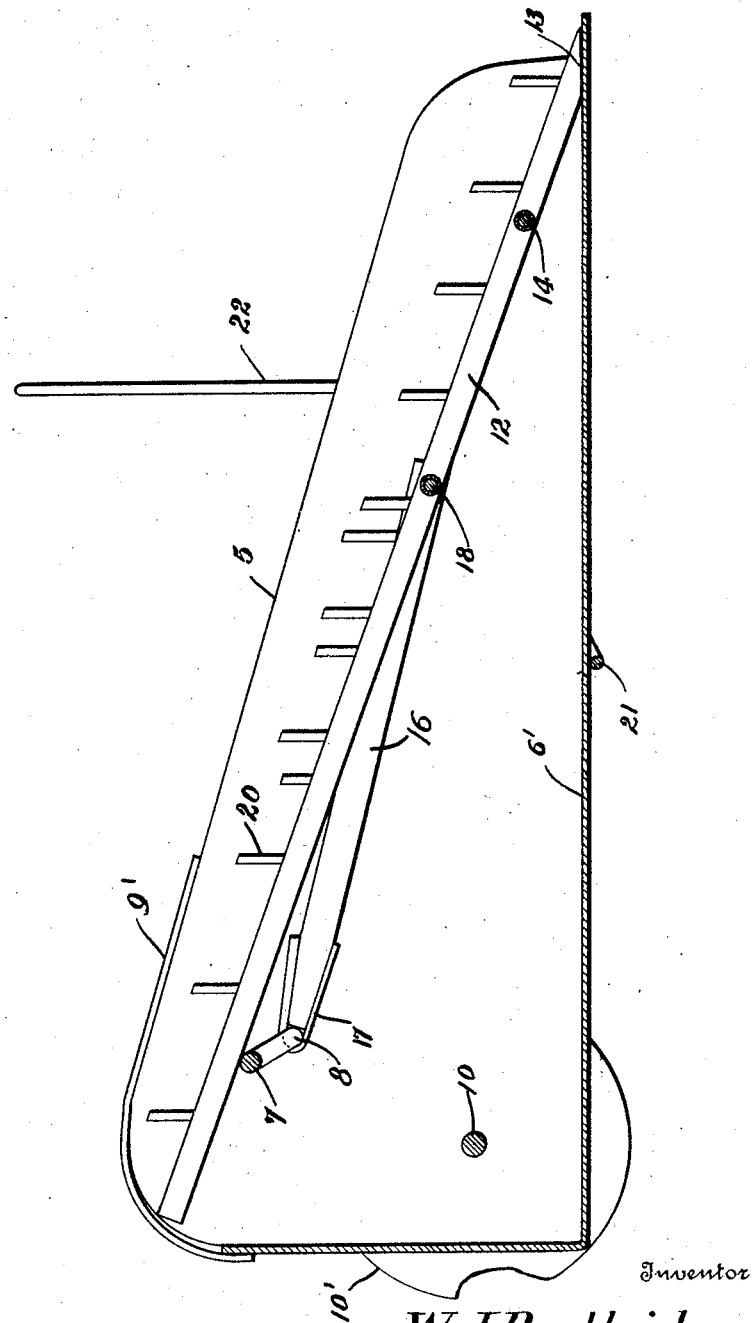

UNITED STATES PATENT OFFICE.

WILLIAM J. PARTTRIDGE, OF CLINTON, LOUISIANA.

SEED-STRIPPER.

1,389,157. Specification of Letters Patent. Patented Aug. 30, 1921.

Application filed August 12, 1920. Serial No. 402,945.

*To all whom it may concern:*

Be it known that I, WILLIAM J. PARTTRIDGE, a citizen of the United States, residing at Clinton, in the parish of East Feliciana and State of Louisiana, have invented a new and useful Seed-Stripper, of which the following is a specification.

This invention relates to seed pans, to be employed in connection with mowing machines for catching the seed which ordinarily falls from the hay during the harvesting thereof, thereby reducing the waste of seed, to a minimum.

The primary object of the invention is to provide a grain pan having novel means for agitating the hay, to cause the seed to fall into the grain pan.

A further object of the invention is to so construct the agitating means to cause the same to discharge the hay rearwardly of the pan.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Fig. 3 illustrates a longitudinal sectional view through the pan, taken on line 3—3 of Fig. 1.

Figure 1:
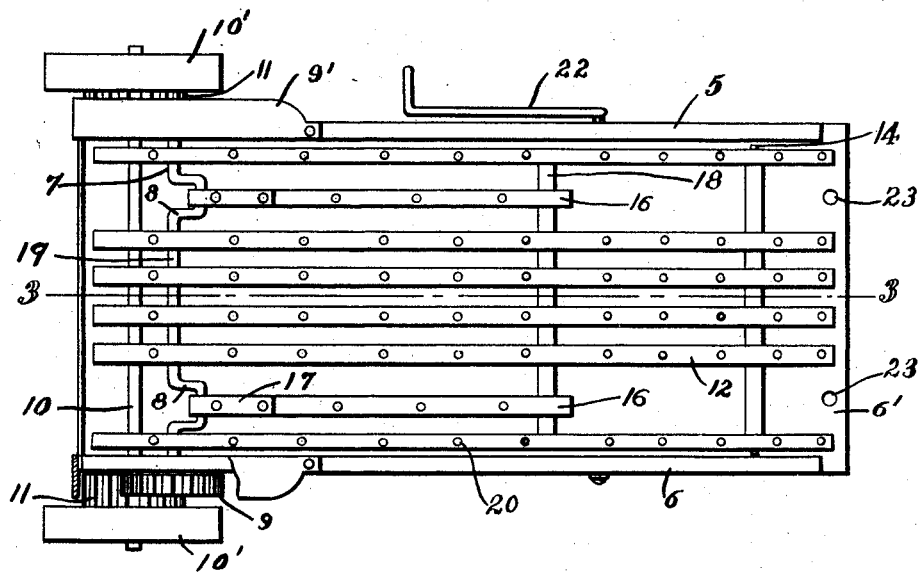
Figure 1 illustrates a plan view of the seed pan.
Figure 2:
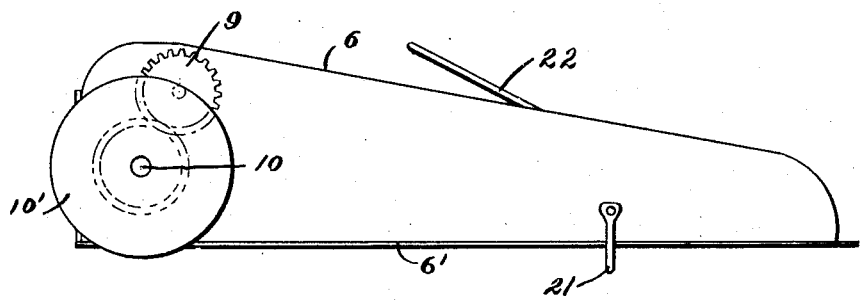
Fig. 2 illustrates a side elevational view of the same.

Referring to the drawings in detail, the grain pan includes the side members 5 and 6, and bottom 6', the side members being tapered toward their forward ends to provide a seed compartment at the rear thereof.

A power shaft 7 is supported by the side members and includes the crank arms 8 disposed adjacent to the ends thereof, the extreme ends of the shaft 7 extending beyond the side members 5 and 6 to accommodate the pinions 9 supported within the housings 9', the pinions being also keyed or otherwise secured to the shaft so that movement of the pinions 9 produces a relative movement of the shaft.

Supporting the pan proper, is an axle 10, which also extends through the side members 5 and 6, and receives the supporting wheels 10', which have the pinions 11 secured to the inner surfaces thereof, which pinions 11 mesh with the pinions 9 to transmit movement of the supporting wheels 10' to the power shaft 7, to cause the operation of the agitating arms 12.

These agitating arms 12, are relatively long, and extend throughout the length of the pan, the forward lower surfaces of the arms 12 being cut away as at 13 to contact with the bottom 6' of the pan proper to move thereon, the arms 12 being connected adjacent to the lower ends thereof by means of the transversely extending rod 14, the rod being between the respective agitating arms to secure them in proper spaced relation with each other.

Movement is transmitted to the agitating arms 12 by the relatively short agitating arms 16, which have connection with the crank arms 8 at the upper ends thereof as by means of the straps or bearings 17, the lower ends of the arms 16 having pivoted connection with the connecting rod 18, which also extends transversely of the arms 12 and 16, to further support the arms in proper spaced relation with each other.

The portion 19 of the power shaft 7, is relatively straight and provides means of support for the upper extremities of the agitating arms 12 to cause the arms to raise and lower within the pan.

Carried by the upper surface of the agitating arms 12 and 16, are the rearwardly extending fingers 20, which in operation contact with the hay or grain under operation, to move the same rearwardly and deliver the same on the ground surface at the rear of the pan where the same may be loaded and stored.

In order that the pan may be supported out of contact with the ground surface on which the same is positioned, the supporting rod 21 is provided, which has pivotal connection with the side members of the pan, the lever 22, formed integral with the rod 21 being provided for operating the rod 21, to move the same to predetermined positions to accomplish the supporting of the pan.

In the operation of the device, the pan is coupled to the usual mower now in use, by suitable means not shown, and which passes through the openings 23, formed at the forward end of the pan, the pan being disposed at the rear and under the cutting blades of the mower, to receive the seed from the hay being mowed, the hay passing into the agitating arms 12 and 16, where the same is carried rearwardly and deposited as heretofore described.

Having thus described the invention, what is claimed as new is:—

1. In an attachment for mowers, a seed pan including side members, a plurality of agitating arms operating between the side members, delivering fingers on the agitating arms, and means to cause reciprocation of the arms.

2. In an attachment for mowers, a seed pan including side members, a power shaft supported by the side members, said power shaft having crank arms, a plurality of agitating arms supported between the side members, relatively short agitating arms associated with the first mentioned arms and having connection with the crank arms of the power shaft, means for supporting the arms in spaced relation with each other, means for transmitting motion to the agitating arms, and means for raising and lowering the seed pan.

In testimony that I claim the foregoing as my own, I have hereto affixed my signature in the presence of two witnesses.

WILLIAM J. PARTTRIDGE.

Witnesses:
  J. A. SMYLIE,
  G. W. HODGES.